(12) United States Patent
Artoni et al.

(10) Patent No.: US 10,836,469 B2
(45) Date of Patent: Nov. 17, 2020

(54) INTEGRATED STABILITY AND CONTROL AUGMENTATION SYSTEM

(71) Applicant: Microtecnica S.r.l., Turin (IT)

(72) Inventors: Ettore Artoni, Milan (IT); Franco Maino, Brugherio (IT); Dario Molinelli, Carnate (IT)

(73) Assignee: MICROTECNICA S.R.L., Turin (IT)

( * ) Notice: Subject to any disclaimer, the term of this patent is extended or adjusted under 35 U.S.C. 154(b) by 399 days.

(21) Appl. No.: 15/837,001

(22) Filed: Dec. 11, 2017

(65) Prior Publication Data

US 2018/0172178 A1  Jun. 21, 2018

(30) Foreign Application Priority Data

Dec. 16, 2016  (EP) .................................... 16204826

(51) Int. Cl.
| B64C 13/40 | (2006.01) |
| B64C 13/50 | (2006.01) |
| B64C 13/18 | (2006.01) |
| B64C 13/42 | (2006.01) |
| B64C 13/44 | (2006.01) |
| F16K 31/122 | (2006.01) |
| G05D 1/08 | (2006.01) |

(52) U.S. Cl.
CPC .............. *B64C 13/40* (2013.01); *B64C 13/18* (2013.01); *B64C 13/42* (2013.01); *B64C 13/44* (2013.01); *B64C 13/504* (2018.01); *F16K 31/1225* (2013.01); *G05D 1/0816* (2013.01)

(58) Field of Classification Search
CPC ......... B64C 13/18; B64C 13/36; B64C 13/40; B64C 13/42; B64C 13/44; B64C 13/46; B64C 13/50; B64C 13/503; B64C 13/504; B64C 13/505; B64C 13/506; B64C 13/507
See application file for complete search history.

(56) References Cited

U.S. PATENT DOCUMENTS

| 2,831,643 | A | 4/1958 | Rasmussen et al. |
| 4,523,891 | A | 6/1985 | Schwartz et al. |
| 4,534,273 | A | 8/1985 | Vanderlaan |
| 2015/0239551 | A1 | 8/2015 | Hervieux et al. |

FOREIGN PATENT DOCUMENTS

| EP | 0115925 A1 | 8/1984 |
| EP | 0164469 A1 | 12/1985 |

OTHER PUBLICATIONS

Extended European Search Report for International Application No. 16204826.8 filed Dec. 16, 2016, 6 pages.

*Primary Examiner* — Nicholas McFall
(74) *Attorney, Agent, or Firm* — Cantor Colburn LLP (57) ABSTRACT

A SCAS module includes one or more SCAS actuators wherein each SCAS actuator comprises a piston arranged for linear motion within a hydraulic chamber in response to a flow of hydraulic fluid metered by a valve. The piston comprises a flexible rod or quill for providing a linear output along the first axis, the flexible rod or quill being mounted internally within an annular portion of the piston so that a space is defined around the flexible rod or quill. The flexible rod or quill is capable of deforming into the surrounding space in order to accommodate movement of the flexible rod or quill.

13 Claims, 10 Drawing Sheets

INTEGRATED STABILITY AND CONTROL AUGMENTATION SYSTEM

FOREIGN PRIORITY

This application claims priority to European Patent Application No. 16204826.8 filed Dec. 16, 2016, the entire contents of which is incorporated herein by reference.

TECHNICAL FIELD

The present disclosure relates to a Stability and Control Augmentation System ("SCAS") for an aircraft, such as a helicopter.

BACKGROUND

The flight controls for a helicopter comprise various actuators that receive input commands from a pilot and provide an output for controlling the rotors in order to cause a desired movement. For instance, for creating movement in a particular direction, the 'cyclic' may be moved in that direction so as to tilt the main rotor blades and generate thrust in that direction. The thrust of the helicopter may be changed by changing the collective pitch of the main rotor blades by moving the 'collective' in order to move the helicopter up and down and/or increase the helicopter speed. The collective pitch of the tail rotor may be controlled by moving yaw pedals to counter the rotational effect of the main rotors.

Thus, helicopters typically comprise three main rotor actuators for providing outputs to the main rotor and one tail rotor actuator for providing outputs to the tail rotor.

A SCAS is used to superimpose an order generated by the flight computer (i.e. the "autopilot") onto the manual input from a pilot to the main or tail rotor. The SCAS therefore helps maintain control and stability of the aircraft. The SCAS traditionally comprises a separate actuator from the main or tail rotor actuators.

SUMMARY

From a first aspect there is provided a Stability and Control Augmentation System ("SCAS") module comprising one or more SCAS actuators, the or each SCAS actuator comprising: a substantially cylindrical hydraulic chamber; a piston arranged for linear motion along a first axis of the hydraulic chamber; and a valve for controlling a flow of hydraulic fluid into the hydraulic chamber to cause the piston to move along the first axis; wherein the piston comprises a flexible rod or quill operatively connected to a first movable element and is arranged for providing a linear output to the first movable element along the first axis such that the linear output causes a movement of the first movable element in a direction parallel to the first axis, wherein the flexible rod or quill is mounted internally within an annular portion of the piston such that a space is defined between the flexible rod or quill and the annular portion in a second direction perpendicular to the first axis, and wherein the flexible rod or quill is configured for deforming into the space to accommodate displacement of the first movable element.

Thus, the piston rod end of the piston is substantially hollow and carries internally a flexible rod or quill. The flexible rod or quill may be rigidly connected to the piston such that the flexible rod or quill moves with the piston along the first axis and the output of the piston may be provided to the first movable element via the flexible rod or quill. The flexible rod or quill may protrude through an end of the annular portion of the piston.

The flexible rod or quill is capable of deforming in a lateral or radial direction to accommodate movement of the first movable element. That is, the flexible rod or quill is capable of deforming to accommodate displacements of the first movable element i.e. displacements that are not caused by the linear output of the piston. For instance, where the first movable element is also connected to other movable elements (e.g. forming part of a larger mechanical assembly, as described below), the flexible rod or quill may be configured to accommodate movement of the first movable element caused by such other movable elements.

Generally, the flexible rod or quill may be configured to deform to accommodate movement of the first movable element in directions other than directions parallel to the first axis. For example, the flexible rod or quill may be configured to deform to accommodate up and down or side to side movement of the first movable element relative to the first axis. In embodiments, the flexible rod or quill may also be configured to accommodate movement of the first movable element in directions perpendicular to the first axis.

Particularly, the flexible rod or quill may be configured to deform to accommodate rotational movement of the first movable element (e.g. relative to the first axis) and/or to accommodate movement of the first movable element along an arc.

The displacement of the first movable element may thus be an angular displacement. Thus, the flexible rod or quill may deform to accommodate angular movement of the first movable element.

The flexible rod or quill may be capable of deforming laterally in a second direction perpendicular to the first axis without changing the linear output provided by the piston to the first movable element. That is, the flexible rod or quill may be capable of deforming to effectively decouple the lateral displacement from the displacement along the first axis.

The flexible rod or quill may be configured to deform by flexing or deflecting into the surrounding space.

The space surrounding the flexible rod or quill within the piston is generally an annular or radial space. However, it will be appreciated that the flexible element need not be mounted co-axially or centrally within the hollow sleeve portion, and may be offset.

It will be understood that the linear output of the piston is a movement that may be used to drive or move the first movable element. The first movable element may form part of the SCAS module, or may be external thereto (i.e. the output of the SCAS module may be provided to the first movable element). Thus, the flexible rod or quill may be operatively connected to a first movable element such that a movement of the piston causes movement of the first movable element in a direction parallel to the first axis.

The flexible rod or quill may be arranged to deform so that the flexible rod or quill remains operatively connected to the first movable element during the angular displacement of the first movable element.

Particularly, the flexible rod or quill may be arranged to remain operatively connected to the same part or to the same position on the surface of the first movable element.

The flexible rod or quill may be connected to the first movable element. That is, there may be a physical, fixed connection between the flexible rod or quill and the first movable element. In embodiments, the flexible rod or quill may be connected to the first movable element by a rotational joint such as a tang and clevis arrangement. In this way, the connection between the flexible rod or quill and the first movable element to the same part or same position on the surface of the first movable element may be maintained as flexible rod or quill follows the movement of the first movable element.

The first movable element may comprise a lever or balance beam.

The SCAS module may comprise first and second SCAS actuators. For instance, the first and second SCAS actuators may be provided for respective first and second hydraulic systems supplying the main or tail rotor actuator.

The first and second SCAS actuators may each be of substantially the same type, e.g. of substantially the same type described above in relation to the first aspect.

The linear outputs of the first and second SCAS actuators may both be provided to the same first movable element.

Particularly, the linear outputs of the first and second SCAS actuators may be provided to a lever or balance beam that acts as a displacement summing device.

Thus, the first and second SCAS actuators may each comprise a flexible rod or quill for providing a linear output to the lever or balance beam, wherein the flexible rods or quills of the first and second SCAS actuators are each operatively connected to the lever or balance beam to provide the linear outputs thereto, wherein the lever or balance beam is arranged to sum or otherwise combine the linear outputs provided by the first and second SCAS actuators, and wherein the flexible rods or quills of the first and second SCAS actuators are configured to deform so as to follow a displacement of the lever or balance beam.

The linear outputs (i.e. or the first axes) of the first and second SCAS actuators may both lie within the same plane (a first plane). The flexible rods or quills may be configured to follow a displacement of the lever or balance beam within the first plane.

For instance, the first and second SCAS actuators may be mounted in a parallel arrangement such that the linear outputs of the first and second SCAS actuators are parallel, and offset, from each other.

The first and second SCAS actuators may be mounted on opposite sides of the lever or balance beam such that the parallel outputs act in opposite senses (i.e. so that an extension of the first SCAS actuator acts in the same way as a retraction of the second SCAS actuator).

The flexible rods or quills of the first and second SCAS actuators may be operatively connected to opposite ends of the lever or balance beam and the linear outputs of the first and second SCAS actuators may be arranged to cause a central point of the lever or balance beam (i.e. a central point disposed between the two ends of the lever or balance beam) to move in a direction parallel to the first axis, wherein the flexible rods or quills are configured to deform to accommodate rotation of the lever or balance about the central point and/or to accommodate movement of said central point along an arc.

In normal use the lever or balance beam may be substantially perpendicular to the parallel axes of the first and second SCAS actuators, and in the event of a failure of one of the first and/or second SCAS actuators, the lever or balance beam may be caused to rotate about its central point towards the first axis of the first or the second SCAS actuator.

The or each SCAS actuator may comprise a biasing element, such as a spring, for biasing the piston towards a pre-determined position when the flow of hydraulic fluid into the hydraulic chamber is zero.

For instance, the biasing element or spring may act to keep the piston in a central or reference position when the actuator is not pressurised. The biasing element may thus act to re-centre the piston, or return the piston to a pre-determined reference position, when the actuator is turned off, or where the hydraulic flow to the actuator is stopped.

The biasing element may be fixed in position within the hydraulic chamber such that the biasing element does not slide within the actuator as the piston moves. For example, the biasing element may be assembled within a fixed guide and arranged so that one side of the biasing element compresses when the piston moves in one direction and another side of the biasing element compresses when the piston moves in the opposite direction.

The valve may comprise an electrohydraulic servo valve.

The or each SCAS actuator may further comprise a solenoid valve for selectively enabling the operation of the SCAS actuator.

The or each SCAS actuator may further comprise a position sensor for monitoring the position of the piston within the hydraulic chamber. Optionally, the position sensor may comprise a linear variable differential transformer. The position sensor may be mounted in the rear portion of the SCAS actuator.

The or each SCAS actuator may further comprise one or more glands mounted internally within the hydraulic chamber, wherein the piston engages the glands as it moves within the hydraulic chamber. The glands may comprise dynamic seals. The glands may be separately formed from the body of the hydraulic chamber. The glands may serve to guide the motion of the piston within the hydraulic chamber.

From another aspect, there is provided an actuator system for a helicopter comprising: a hydraulic actuator for providing an output to a main or tail rotor of the helicopter; a SCAS module substantially as described herein; a control valve for controlling the flow of hydraulic fluid to the hydraulic actuator to vary the output provided to the main or tail rotor; and a linkage mechanism connecting the control valve to the hydraulic actuator, the linkage mechanism comprising a plurality of interconnected levers including a first lever for receiving an input from a pilot, and a second input arranged to receive an output from the SCAS module, wherein the linkage mechanism is configured to sum or otherwise combine the outputs from the first and second levers into a composite command and to transmit the composite command to the control valve to control the flow of hydraulic fluid to the hydraulic actuator.

The SCAS module or actuator system may further comprise a flight control system for providing electrical command signals to the one or more SCAS actuators, wherein the valve controls the flow of hydraulic fluid into the hydraulic chamber, and hence the position of the piston along the first axis of the hydraulic chamber, in response to the electrical command signals.

The motion of the piston(s) along the first axis within the hydraulic chamber(s) of the one or more SCAS actuator(s) may be limited by one or more end stops provided within the SCAS module and/or within the linkage mechanism. Thus, the motion of the pistons of the SCAS actuator(s) may be constrained within a certain range determined by the positions of the end stops. In this way, the output of the SCAS may be limited.

From a further aspect there is provided a helicopter comprising a main rotor, a tail rotor, and an actuator system substantially as described herein, wherein the actuator system controls a position and/or orientation of the main rotor and/or of the tail rotor.

BRIEF DESCRIPTION OF THE DRAWINGS

Various embodiments will now be described, by way of example only, and with reference to the accompanying drawings in which.

DETAILED DESCRIPTION

The present disclosure relates generally to actuator systems for use in controlling the flight of an aircraft, such as actuator systems for controlling the main and tail rotor actuators of a helicopter. An actuator system generally comprises a hydraulic actuator designed to accept mechanical and/or electrical input commands in order to control an output position of the actuator (or a ram of the actuator) which in turn drives an external movable element. For instance, the output of the main rotor actuator acts to change the position and/or orientation of the main rotor blades. Similarly, a tail rotor actuator accepts mechanical and/or electrical input commands in order to change the position and/or orientation of the tail rotor blades. By controlling the position and/or orientations of the main and tail rotor blades of a helicopter, movement may be created in a known manner.

The input commands for controlling the actuator output may be received either from the pilot or from a stability and control augmentation system ("SCAS"), wherein the SCAS is controlled by electrical input signals received from the Flight Control System ("FCS") of the aircraft, or typically from both the pilot and the SCAS. The FCS may also be referred to as the flight computer, or autopilot. The pilot typically has full authority over the output of the actuators, whereas the SCAS has only a limited authority. The SCAS may therefore effectively superimpose commands over the pilot's input to provide relatively fine corrections to help stabilise the helicopter flight.

Embodiments of the present disclosure relate to actuator systems with an integrated SCAS. That is, the SCAS commands may be integrated within the mechanical input to the actuator such that the SCAS is an integral part of the control module. Thus, the output from the SCAS module and the pilot input may both serve as input into the same mechanical system, which is then used to control the actuator. Generally, the output of the SCAS (i.e. the SCAS actuator output) is used to drive a movable element, which may e.g. comprise a component such as a lever within the integrated mechanical input system. Because the SCAS module is integrated into the same mechanical system as, and hence interconnected with, the actuator and the pilot input lever, the movable element to which the output of the SCAS module is provided may also move in response to inputs provided by the pilot, or other movement of the actuator. The SCAS actuators may therefore need to accommodate movement of the movable element to which they are connected, and this movement will typically be in a direction other than the direction of the (linear) output of the SCAS actuators. For instance, the output of the SCAS actuators may be provided to one end of a lever that forms part of a linkage mechanism used to interconnect the actuator, the pilot inputs, the control valves and the SCAS module, such that movement of the pilot input lever, or the actuator, may cause the lever to move in directions other than the direction of the SCAS actuator output provided thereto.

Accordingly, in some embodiments, the present disclosure relates to a SCAS module comprising one or more SCAS actuators, the or each SCAS actuator comprising: a substantially cylindrical hydraulic chamber; a piston arranged for linear motion along a first axis of the hydraulic chamber; and a valve for controlling a flow of hydraulic fluid into the hydraulic chamber to cause the piston to move along the first axis; wherein the piston comprises a flexible rod or quill operatively connected to a first movable element and is arranged for providing a linear output to the first movable element along the first axis such that the linear output causes a movement of the first movable element in a direction parallel to the first axis, wherein the flexible rod or quill is mounted internally within an annular portion of the piston such that a space is defined between the flexible rod or quill and the annular portion in a second direction perpendicular to the first axis, and wherein the flexible rod or quill is configured for deforming into the space to accommodate angular displacement of the first movable element.

Because the SCAS actuator output is provided via the flexible rod or quill, which deforms or bends in response to lateral movement, the output is able to follow lateral movement of an element to which the output of the piston is provided (e.g. a lever to which the flexible rod or quill is operatively connected) without transferring side loads to the remainder of the piston. In various embodiments, this may thus provide a higher reliability, and improved safety of the SCAS actuator. The flexing of the flexible member may also help to accommodate any misalignment between the components.

Although in various embodiments of the present disclosure the output of the actuator system is arranged to control the main or tail rotor of a helicopter, it will be appreciated the techniques described herein may in general be applied to various SCAS actuator system (i.e. not limited to helicopter main or tail rotors). For instance, the techniques described herein may be used for controlling one or more flight control surfaces of an aircraft. Accordingly, whilst various embodiments will now be described with particular reference to a main rotor actuator of a helicopter, it will be appreciated that the present disclosure may extend to other systems. Particularly, it will be appreciated that the present disclosure extends equally to both the main and tail rotor actuators of a helicopter, and that any references or disclosures relating to a main rotor actuator should therefore also be taken as references or disclosures of the same features in relation to a tail rotor actuator.

Figure 1:
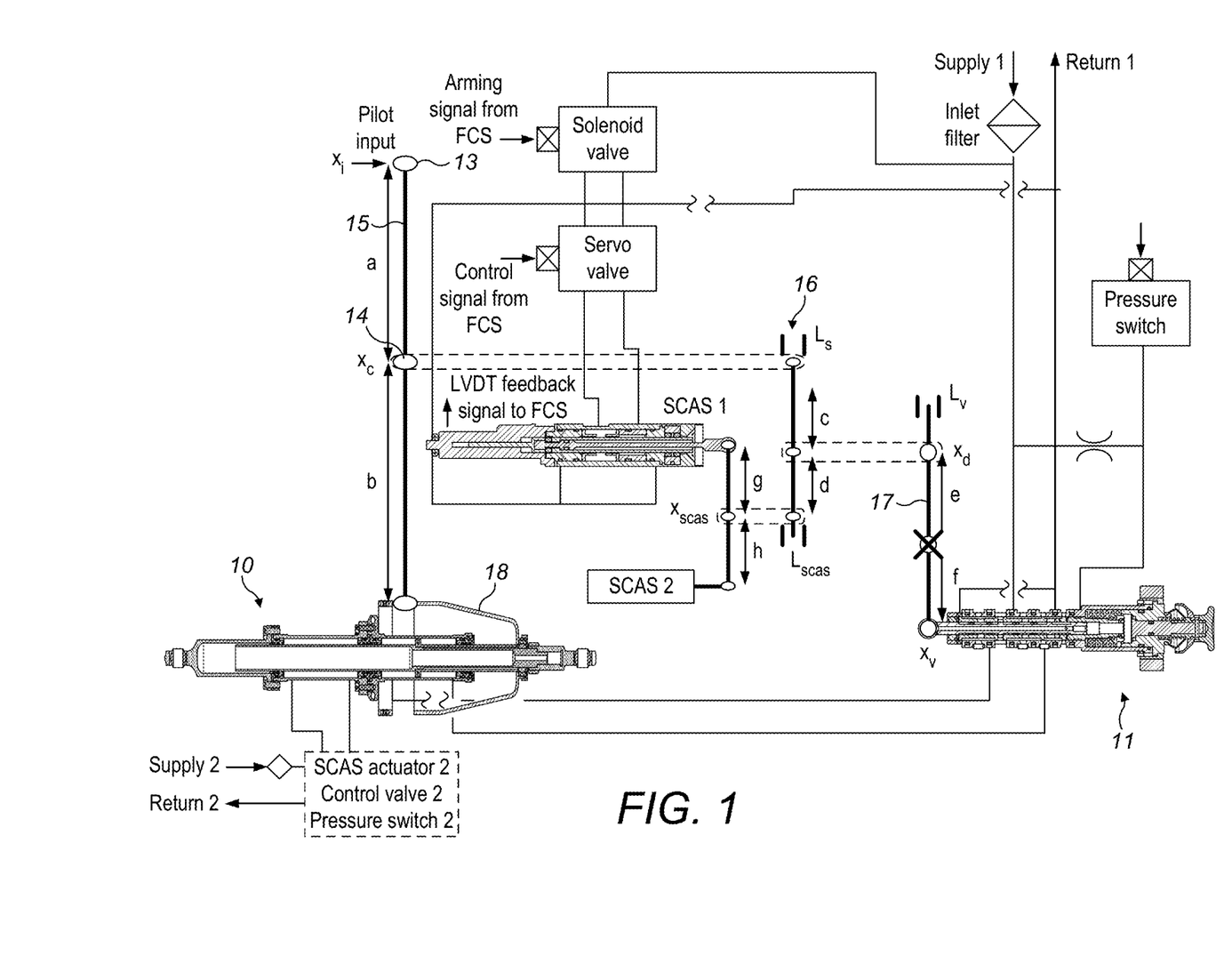
FIG. 1 shows schematically an actuator system according to various embodiments of the present disclosure.

FIG. 1 illustrates conceptually the arrangement of various components that may constitute a main (or tail) rotor actuator system with an integrated SCAS module according to some embodiments of the present disclosure, and how these components interrelate and interact with each other, as explained in more detail below.

Figure 2:
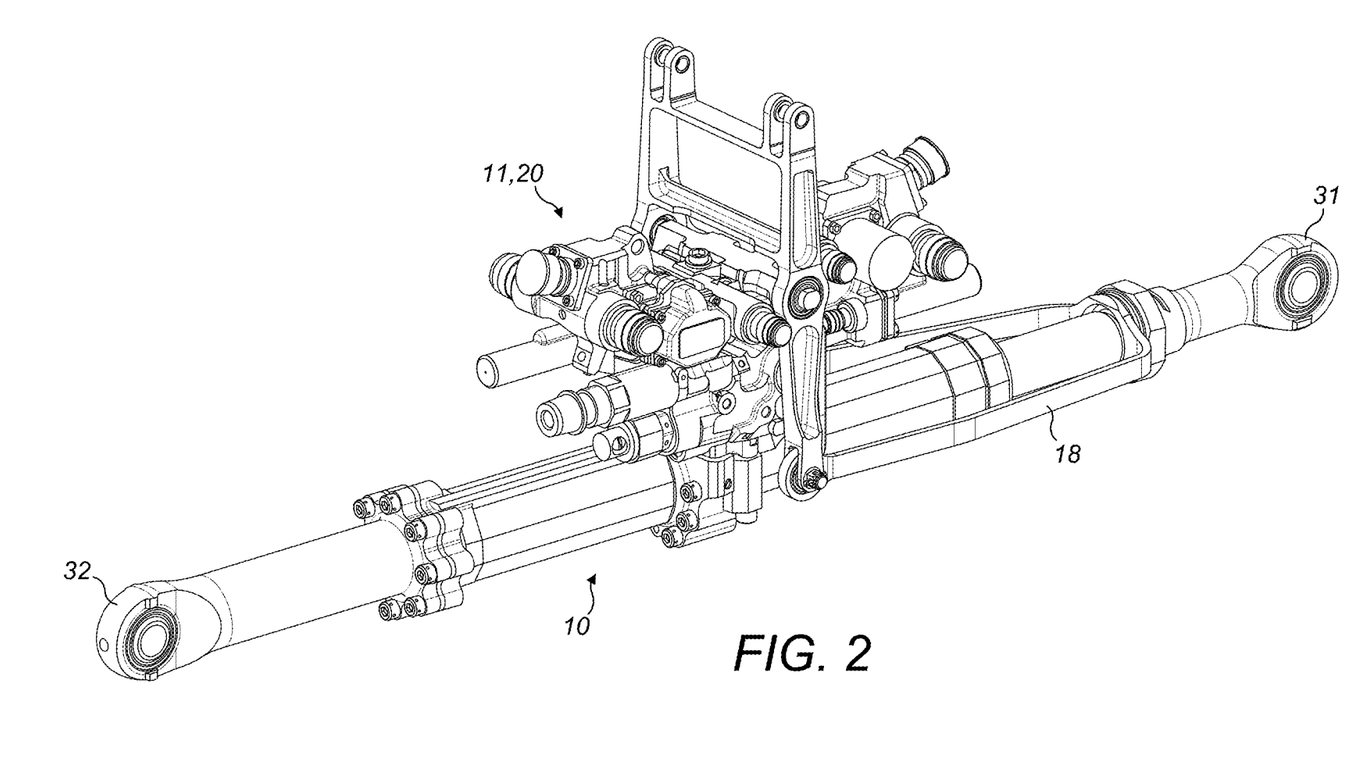
FIG. 2 shows a perspective view of an assembled main rotor actuator system with an integrated SCAS module.

FIG. 2 shows an assembled main rotor actuator system of the type shown conceptually in FIG. 1.

Figure 3:
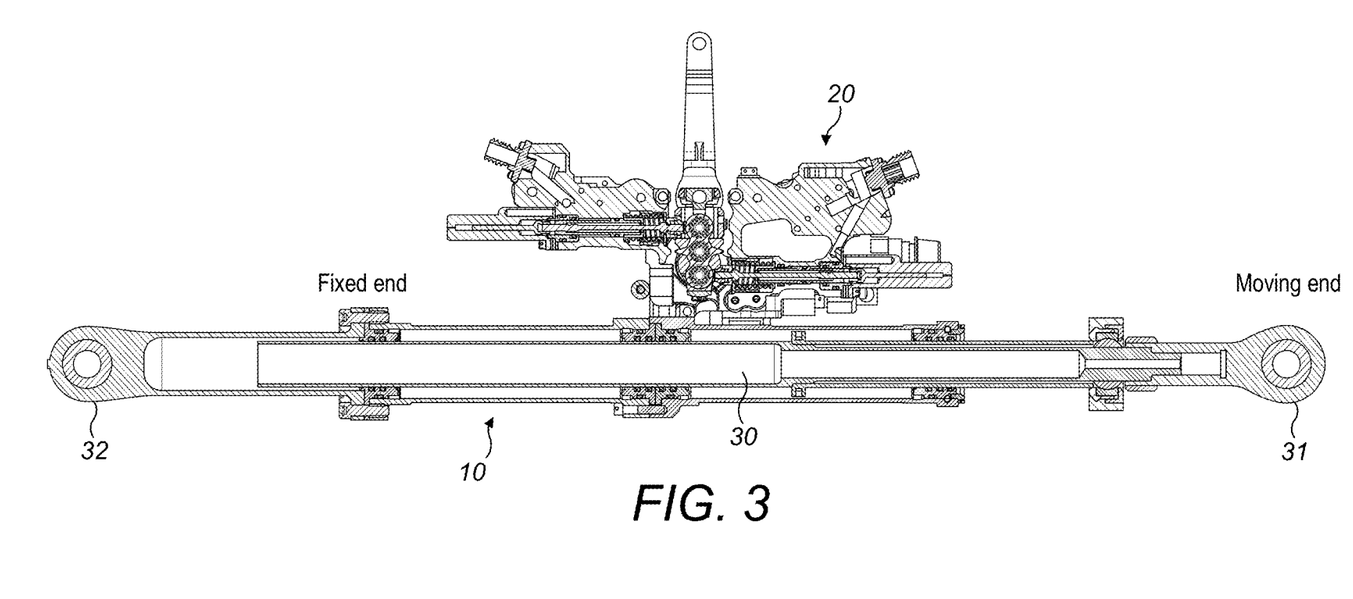
FIG. 3 shows a cross-sectional side-on view of the main rotor actuator system of FIG. 2.

FIG. 3 shows a side-on cross section of the main rotor actuator system of FIG. 2.

The main rotor actuator system, as shown in FIGS. 1 to 3, comprises a hydraulic actuator 10 comprising a double-acting piston 30 arranged to slide linearly within a substantially cylindrical housing.

As shown in FIGS. 1 to 3, the piston 30 may carry two piston sections arranged in a tandem configuration such that both piston sections slide within the two cylinders.

An actuator rod end 31 may be mounted at the moving rod side of the piston 30 to facilitate connection of the piston 30 to the helicopter moving parts. The actuator rod end 31 may e.g. end with a spherical joint as shown in FIGS. 2 and 3. Generally however the actuator rod end 31 may take any form suitable for interfacing with the parts to which it is connected in use. The actuator rod end 31 may be mounted to the piston 30 in any suitable manner. For example, the rod end 31 may be mounted by means of a threaded connection. A locking mechanism may also be provided such as a tab washer provided on the rod end 31 for engaging with an axial milling in the piston 30.

At the fixed end side of the hydraulic actuator 10, an end cylinder 32 may be mounted as shown in FIGS. 2 and 3, to facilitate interfacing the actuator 10 with the helicopter transmission structure. The end cylinder 32 may e.g. be mounted by a flange. The end cylinder 32 may be provided with a spherical bearing to facilitate interfacing the actuator 10 with the helicopter transmission structure.

The rod end 31 and end cylinder 32 may both be provided as replaceable parts.

In embodiments, the actuator 10 has equal thrust areas, and hence provides equal forces in both directions for the same pressure differential. The dimensions of the thrust areas may be selected such as to develop the required stall loads in the extend and retract directions.

Referring back to the arrangement shown in FIG. 1, it can be seen that the output of the main rotor actuator 10 is controlled by a linkage mechanism connecting the main rotor actuator 10 to the main control valve 11 via a feedback link 18. The linkage mechanism comprises a series of interconnected levers.

Particularly, as shown in FIG. 1, the linkage mechanism may comprise a first input lever 15 arranged to receive a pilot input at one end 13, wherein the opposite end of the input lever 15 is connected to the feedback link 18 which is hinged to the output of the actuator 10. Thus, the midpoint 14 of the first input lever 15 will be displaced, in use, by an amount equal to half the difference between the pilot input end 13 of the lever 15 and the displacement of the piston 30 of the actuator 10. The midpoint 14 of the input lever 15 may thus provide a mechanical input to the downstream portion of the linkage mechanism, and this input is transmitted to the control valve(s) 11. Responsive to this, the control valve(s) 11 may then meters the fluid flow to/from respective control lines to the hydraulic actuator 10 to cause the actuator output to change.

Thus, it will be appreciated that the linkage mechanism effectively acts as an internal feedback loop that mechanically performs the difference between an input command (either from the pilot as described above, or from the SCAS module, as explained in more detail below) and the output of the actuator 10. This difference may be used to determine the position of spools of the control valve(s) 11 that port the hydraulic fluid to the appropriate chambers of the tandem hydraulic actuator 10. The pressures acting on the piston 30 of the actuator 10 thereby develop the force necessary to drive the external load, i.e. to move the main (or tail) rotor.

As shown in FIG. 1, a SCAS module 20 is integrated within the mechanical input system of the actuator 10 via the linkage mechanism. Particularly, the midpoint 14 of the first input lever 15 is connected by a hinge to one end of an intermediate lever 16, with the other end of the intermediate lever 16 connected to the SCAS module 20. The intermediate lever 16 thus acts to sum the commands from the pilot and the SCAS into a single composite command. The composite command is then transmitted by a further layshaft lever 17 to the control valves 11. For example, as shown in FIG. 1, the layshaft lever 17 may rotate about a fixed hinge, with one end of the layshaft lever 17 connected to the midpoint of the intermediate lever 16 and the other end of the layshaft lever 17 connected to the spools of the control valves 11. As a result, the spools of the control valves 11 are moved in response to input commands from the pilot and/or SCAS.

Figure 4:
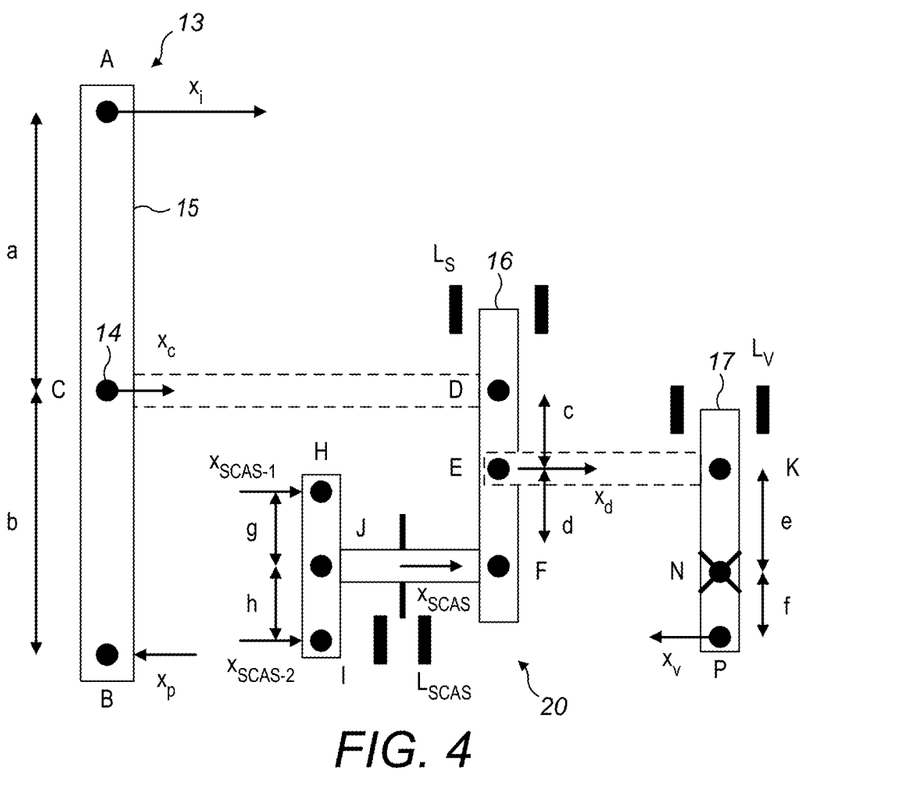
FIG. 4 shows a diagram of the linkage mechanism within the actuator system.
Figure 5:
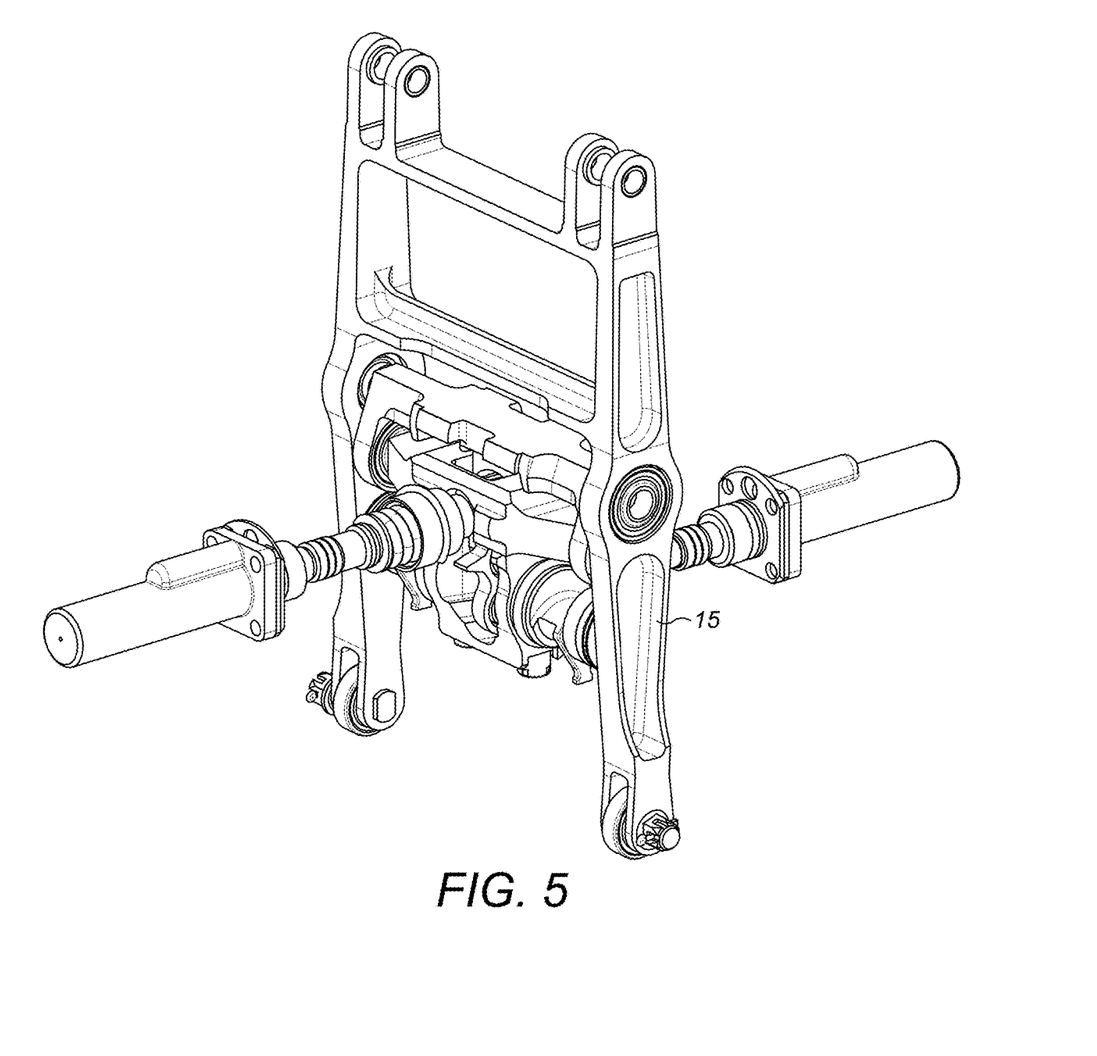
FIG. 5 shows a perspective view of the linkage mechanism.

The linkage mechanism described above is shown schematically in more detail in FIG. 4. A perspective view of the linkage mechanism is shown in FIG. 5. As explained above, the linkage mechanism is a mechanical transmission system comprising a series of levers and bars mutually interconnected by means of hinges such that the linkage mechanism acts to combine and transmit various inputs to the control valves 11 in order to control the output of the actuator 10. Thus, an input lever 15 is provided that accepts the pilot input $x_i$ at one end 13, and accepts the displacement $x_p$ of the actuator 10 at the opposite end, e.g. via the feedback mechanism 18. The intermediate point 14 of the input lever has a common hinge with the upper end (D) of the intermediate lever 16 which accepts the common output of the SCAS module 20 at its lower end (F). The intermediate point (14) of the intermediate lever 16 in turn has a common hinge with the upper end (K) of the layshaft lever 17 that rotates about a fixed hinge (N), such that the lower end (P) of the layshaft lever 17 drives the spools of the control valves 11.

When a command to the main rotor actuator 10 is provided by the pilot at the upper end 13 of the first lever 15 and the actuators of the SCAS module 20 are stationary, the common output (J) of the SCAS module 20 is held fixed by the SCAS actuators and the control valve spools are displaced proportionally to the differential movements of pilot input and actuators travel, which implements a feedback loop for the actuators position, as explained above. On the other hand, when the command to the main rotor actuator 10 is generated by the SCAS actuators (i.e. by the FCS) while the pilot input is stationary, the upper end 13 of the input lever 15 acts as a fixed point, and the displacement of the actuator 10 causes a rotation of the input lever 15 about its upper end 13 thereby causing a movement of its intermediate point 14 and eventually a movement of the hinge (E) of the intermediate lever 16. The intermediate lever 16 acts in this case as a walking beam in which the displacement of its intermediate point (E) is a linear combination of the travels of the points labelled J and D in FIG. 4, i.e. the output of the SCAS module (J) and the connection between the midpoint 14 of the first input lever 15 and the intermediate lever (D).

It will be appreciated that the linkage mechanism need not take the form shown in FIG. 4, and various suitable linkage mechanisms for combining and transmitting the various inputs to the control valves 11 in order to control the output of the actuator 10 are contemplated. However, a linkage mechanism similar to that shown in FIG. 4 may provide a compact assembly, with a minimum number of parts and linkages. The linkage mechanism may therefore help minimise the degradation effects on performances due to misalignment of the various components without the use of additional linkages and spherical bearings which, because of wear, could introduce backlash and affect the SCAS dynamics.

The linkage mechanism generally, in whatever form it takes, including but not limited to that shown in FIG. 4, may contain various travel limits or end stops ($L_{SCAS}$) for the common output of the SCAS module 20 in order to limit the SCAS authority. Further travel limits ($L_S, L_V$) may also be provided e.g. to prevent the control valve spools from hitting their end stops. The linkage mechanism may ensure a dual load path except for the common output of the SCAS module, which may be a common element for multiple load paths (i.e. where the SCAS module comprises multiple SCAS actuators with independent load paths).

The components of the linkage mechanism may have a relatively stiff construction such to prevent any undesirable mechanical compliance in closing the actuator position feedback loop. The same is valid for the hinge points where ball bearings have been used to minimize the backlash. In the arrangement shown in FIG. 4, a spherical bearing may only be used for the feedback lever connection to the piston rod, where angular movement and loads are very limited.

Figure 6:
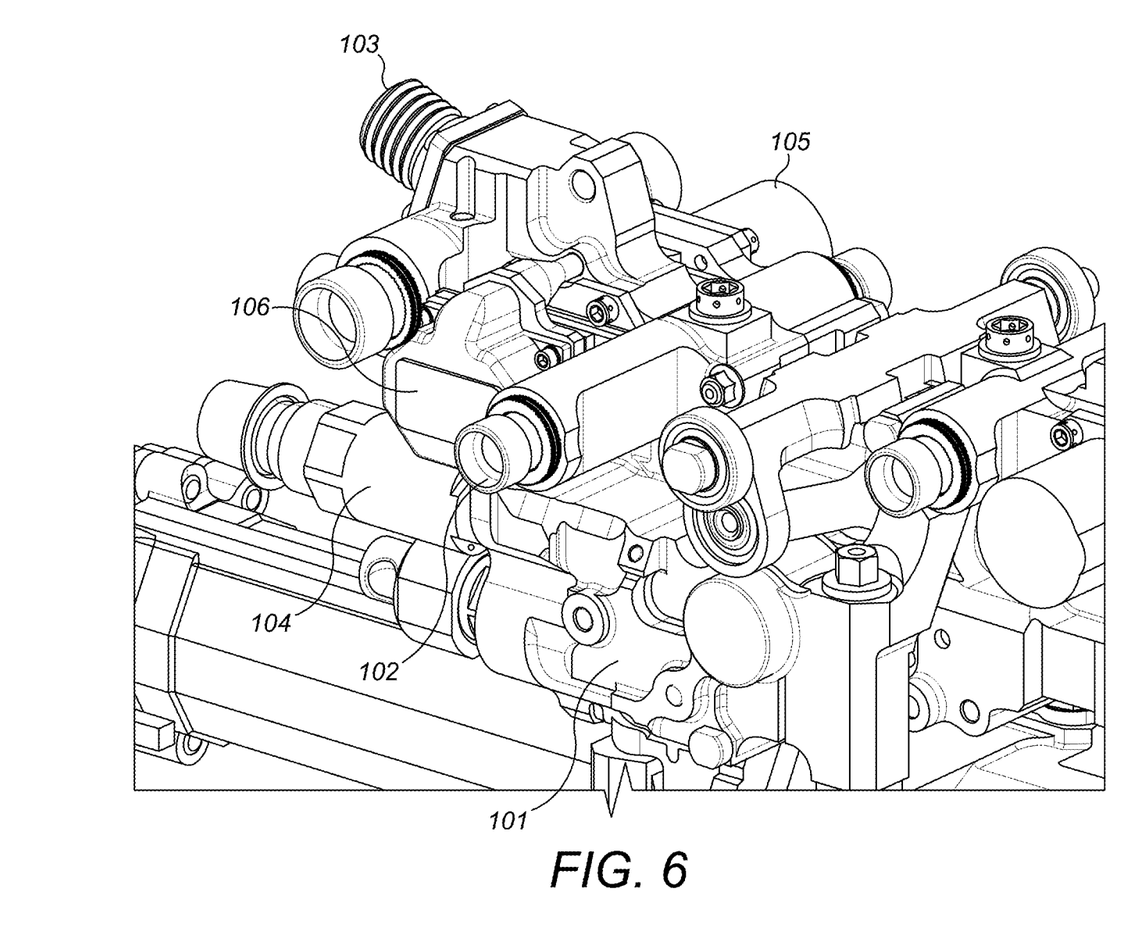
FIG. 6 shows the installation of an integrated SCAS and control valve module onto the main rotor actuator system.
Figure 7:
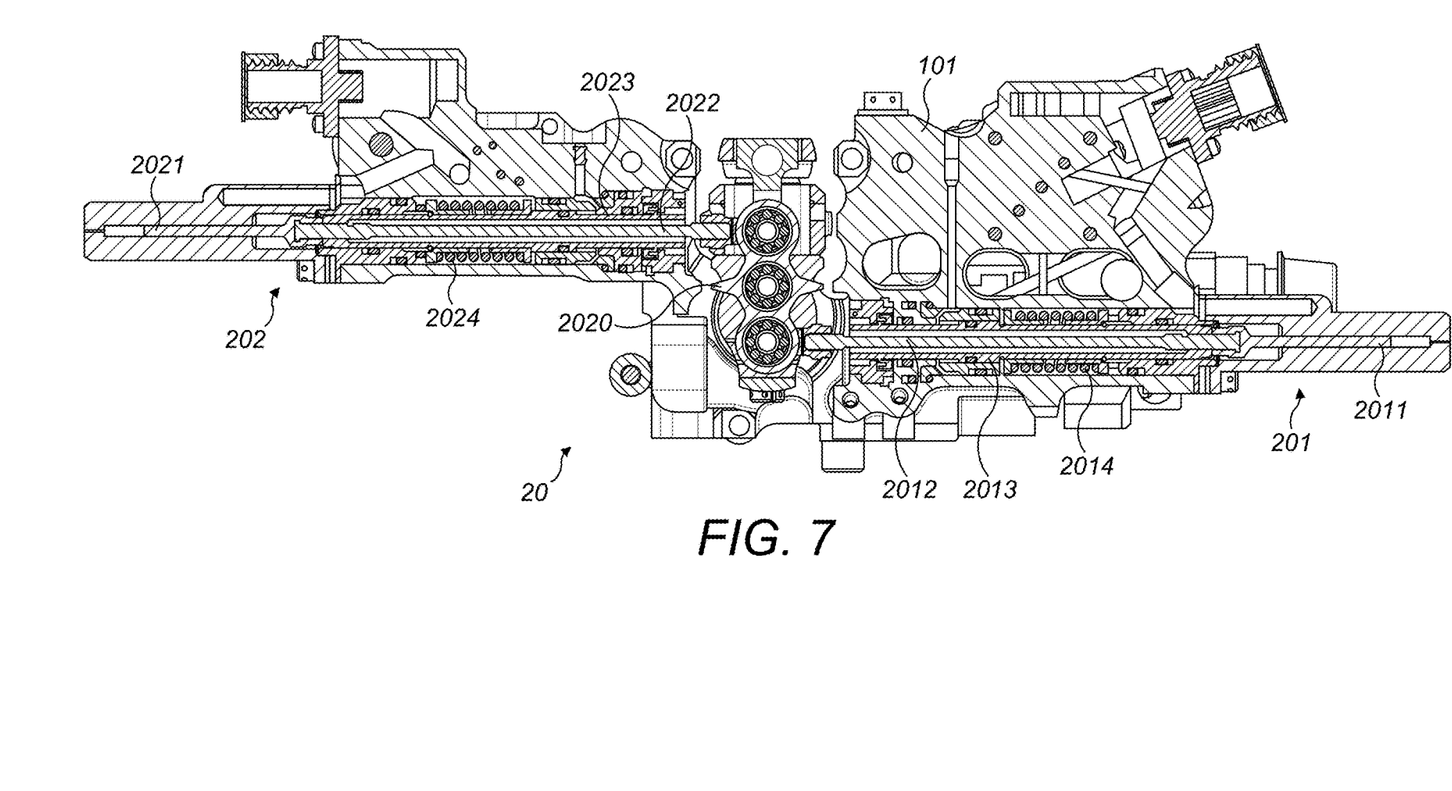
FIG. 7 shows a cross-sectional view of the SCAS module.

The SCAS module 20 may be integrated with the main control valve 11 as shown in FIG. 6. FIG. 6 shows the SCAS and main control valve body 101 with the hydraulic adapter 102, electrical connector 103, pressure switch 104, solenoid valve 105 and the servo valve 106 for the SCAS actuator. All of the hydraulic components of the SCAS module 20 may be supported by the body 101, which may also contain various passageways for the mutual interconnection of the SCAS components, as shown in FIG. 7. The body 101 may be mounted onto the associated hydraulic actuator 10 in various ways, including e.g. via steel bolts. The body may e.g. be formed from stainless steel, or other suitable materials.

A cross-section of the SCAS module 20 integrated within the body 101 is shown in FIG. 7. As shown in FIG. 7, the SCAS module 20 may comprise a pair of SCAS actuators 201,202, each actuator comprising a hydraulic module comprised of a spring-centred hydraulic linear actuator, an electrohydraulic servo-valve, a solenoid valve (not shown in FIG. 7), and a position sensor or transducer, such as a Linear Variable Differential Transformer ("LVDT") 2011,2021. Each SCAS actuator 201,202 interfaces with the flight control system, which provides an electrical input signal to modulate the respective servo valves to control the flow of hydraulic fluid to the SCAS actuators 201,202, and also provides an on/off signal to the solenoid valve to enable/disable the actuator operation.

As shown in FIG. 7, the first SCAS actuator 201 may comprise a double acting piston 2013 that is arranged to move in response to a controlled hydraulic flow provided by a respective servo valve. The servo valve in turn is controlled by electrical signals generated by the flight control system. The piston 2013 may have balanced thrust areas, providing equal forces in both directions and equal flows through the servo valve control ports.

The piston 2013 may slide inside one or more glands mounted within in the cylinder body. The glands may thus act to guide the motion of the piston 2013. In some embodiments, the glands are not integral with the cylinder body. The glands may be made of various materials with good sliding properties. Glands may be provided at either end of the actuator 201, with the glands providing dynamic seals.

The piston 2013 may be also connected to a position sensor 2011, such as an LVDT type position transducer. In FIG. 7, an LVDT type position sensor 2011 is mounted on the rear of the SCAS actuator 201. In embodiments, the position transducer may comprise a LVDT providing electrical output signal proportional to the input displacement. The LVDT may be of a 5-wire type, thereby providing two independent electrical signals for its two secondary coils. This feature enables the flight control system to implement an effective monitor of the LVDT by continuously checking the summed output voltage of the two independent electrical signals, which must be a constant value, proportional to the input voltage, and to perform a ratiometric reading (the ratio of the difference between the two independent electrical signals to the summed output of the two independent electrical signals). This may help to improve the position measurement accuracy by eliminating most of the effects related to input voltage and ambient temperature variations.

A spring detent device (centering spring) 2014 may be provided to keep the piston in a pre-determined 'central' position when the actuator is not pressurized. The spring preload may be set to a value much greater than that corresponding to the maximum force required to move the control valves spools of the servo actuator in order to allow the unpressurized SCAS actuator to remain in the reference centred position while providing the necessary reaction force to ensure the system operation in response to either the pilot commands or to the other SCAS actuator movement. The spring 2014 may be fixed in position within the hydraulic chamber such that the spring does not slide within the actuator, thus reducing any frictional forces or wear between the spring 2014 and the cylinders. For example, the biasing element may be assembled within a fixed guide and arranged so that one side of the biasing element compresses when the piston moves in one direction and another side of the biasing element compresses when the piston moves in the opposite direction, but so that the spring 2014 does not slide as the piston moves.

The solenoid valve may be an electrically operated, two-position, three-way, normally closed valve. The valve may be single electrical, accepting the electrical current from the flight control system. When the coil is de-energized the supply port of the solenoid valve is closed and the control port is connected to return; when the coil is energized the control port is connected to supply while the return port is closed.

The servo valve may be a four-port, two-stage, electrically operated valve controlling the flow to the SCAS hydraulic actuator as a function of the electrical signal received from the aircraft flight control system. The servo valve may have the two coils connected in parallel. This feature may allow the servo valve to still operate, albeit with reduced capability if one of the coils is interrupted. For a given pressure drop the fluid flow is directly proportional to the spool displacement. The position of the spool is proportional to the applied electrical signals, thus enabling control of the magnitude, as well as the direction, of the fluid flow.

The second SCAS actuator 202 may have substantially the same, or indeed an identical, construction as the first SCAS actuator 201. Particularly, as shown in FIG. 7, the second SCAS actuator 202 may also comprise a second piston 2023 carrying a second flexible rod or quill 2022 for providing a linear output to the central balance beam 2020. The second SCAS actuator 202 may also comprise a second position sensor 2021 and a second spring detent device 2024.

As shown, in FIG. 7, the two SCAS actuators 201,202 may be mounted in parallel configuration with their outputs connected to a movable element in the form of a common lever or "balance beam" 2020. For optimizing the packaging of the whole servo actuator, the two SCAS actuators are mounted in opposite directions, such that in normal use when one SCAS actuator is commanded to extend, the other one is commanded to retract. Thus, the piston rod ends of the two SCAS actuators 201,202 are interconnected by means of the balance beam 2020, and the balance beam 2020 may therefore perform a sum of the outputs from the two SCAS actuators 201,202. The central point C of the balance beam 2020 drives the common output link of the SCAS module 20 that is connected to the end of the intermediate lever 16 of the linkage mechanism, as described above in relation to FIG. 1. As mentioned above, and as shown in FIG. 1, the output link displacement may be limited by hard stops ($L_{SCAS}$) provided within the linkage mechanism to limit the SCAS authority.

The actuators 201,202 move in response to the commands received from the flight control system. Since the distance between the SCAS actuators axis and the direction of movement of the midpoint C of the balance beam 2020 is equal for both actuators 201,202, and is a fixed value, the position $x_i$ of the output element is given by:

$$x_c = \frac{x_a + x_b}{2},$$

where $x_a$ and $x_b$ are respective the individual displacements of the two SCAS actuators 201,202.

During normal operating conditions, both SCAS actuators 201,202 operate, and the displacements $x_a$ and $x_b$ of the two SCAS actuators 201,202 are approximately equal. Hence the balance beam 2020 is kept approximately perpendicular to the axes of the SCAS actuators 201,202.

The rod end of each piston 2013,2023 comprises a substantially hollow portion that carries internally a flexible rod or quill 2012,2022. That is, the hollow portion of each piston 2013,2023 defines an annular sleeve around the flexible rods or quills 2012,2022 such that a radial space is defined between the rods or quill 2012,2022 and the pistons 2013, 2023. The pistons 2013,2023 of the SCAS actuators 201,202 are therefore operatively connected to the balance beam 2020 via the flexible rods or quills 2012,2022 which protrude through the hollow end of the pistons 2022,2023. The flexible rods or quills 2012,2022 are provided with a relatively large amount of bending flexibility, and are thus capable of bending or deforming into the surrounding space in order to accommodate angular rotations as the SCAS actuators 201,202 extend and retract, without the need for introducing additional linkages and joints. The flexible rods or quills 2012,2022 may therefore help minimise backlash and wear in the system, and thus improve the performance and endurance of the SCAS actuators 201,202.

Figure 8A:
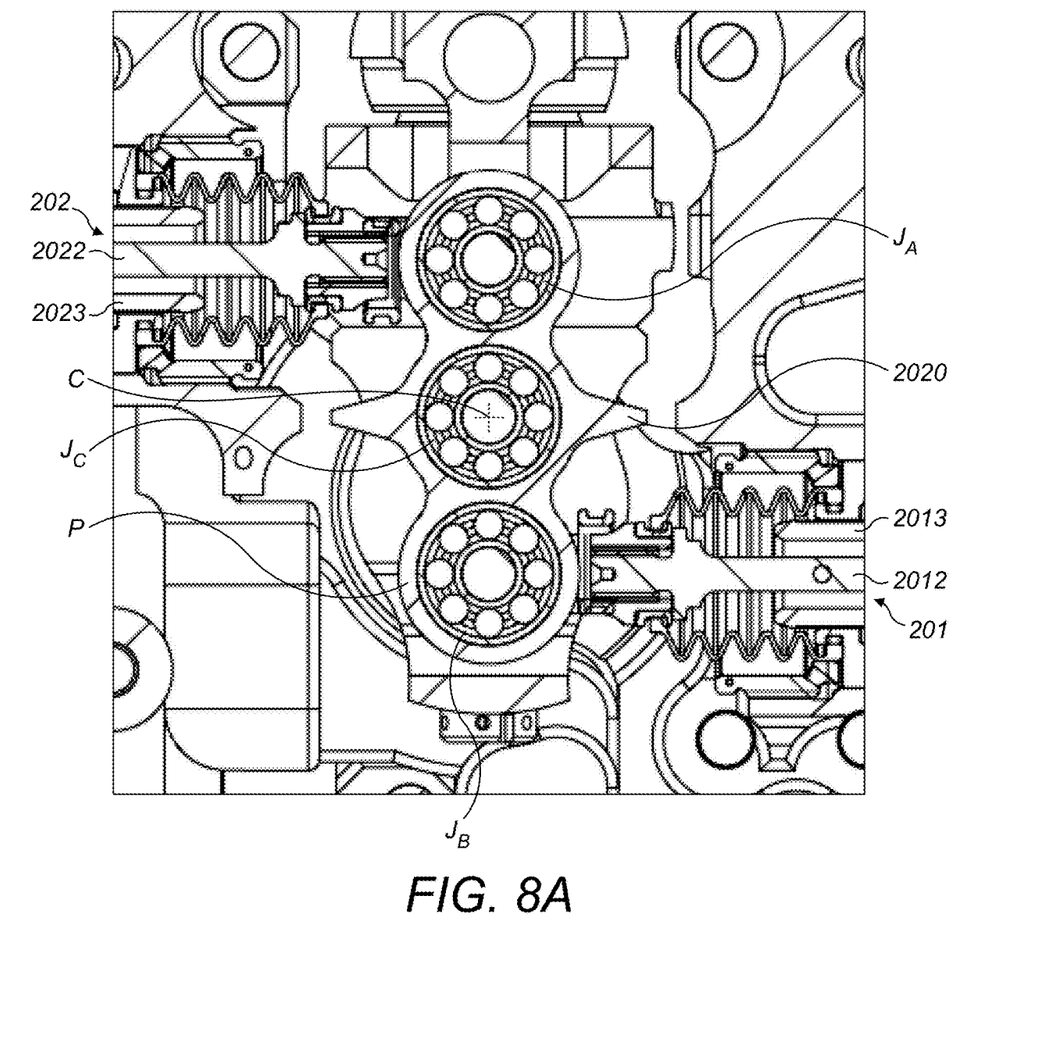
FIG. 8A shows the interconnection of the SCAS actuators with a central balance beam according to various embodiments of the present disclosure.

The interconnection of the two SCAS actuators 201,202 with the balance beam 2020 is shown in closer detail in FIG. 8A.

In general, the flexible rods or quills 2012,2022 of the two SCAS actuators 201,202 may be connected in various suitable fashions to the balance beam 2020. Typically, the flexible rods or quills 2012,2022 may be connected to the balance beam 2020 by a rotational joint such as a tang and clevis (or fork and pin) arrangement (not shown) that allows the flexible rods or quills 2012,2022 to remain connected to the balance beam 2020 as the flexible rods or quills 2012, 2022 deform to follow displacement of the balance beam 2020 along an arc. The tang and clevis arrangement may allow the joint to rotate as the flexible rods or quills 2012,2022 move up and down (i.e. in the plane shown in FIG. 7). The tang and clevis arrangement may also allow some sliding to accommodate movement in and out of the plane shown in FIG. 7. Other suitable connections between the flexible rods or quills 2012,2022 and the balance beam 2020 may be made e.g. using a universal joint. Two bearings $J_A,J_B$ perform the mechanical connection between the SCAS actuators rods 2012,2022 and the connecting rod P, which houses the bearings and which makes up the balance beam 2020. A third bearing $J_C$ ensures the mechanical connection between the midpoint C of the balance beam 2020 and an output element which may be connected by means of a link to the linkage mechanism of the actuator 10, as shown e.g. in FIG. 1.

Figure 8B:
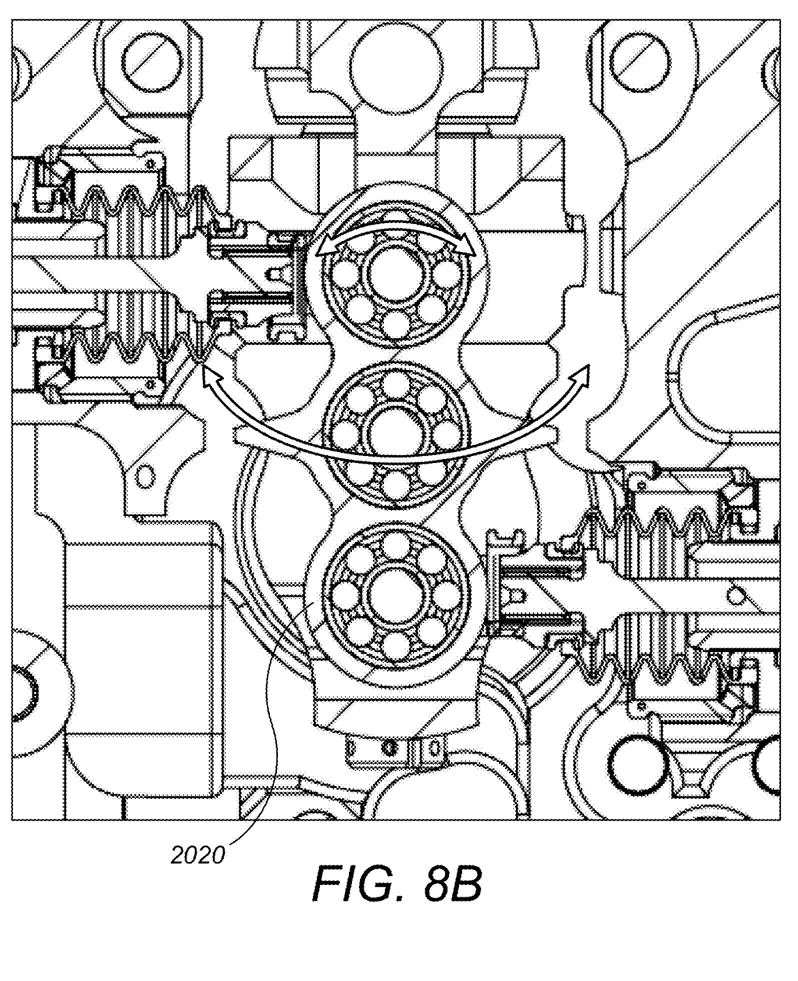
FIG. 8B shows various angular displacements of the central balance beam that the SCAS actuators may need to accommodate.

Because the central point C of the balance beam 2020 is connected via the output element to the other levers within the linkage mechanism, the balance beam 2020 is not only moved by the SCAS actuators 201,202, but may also be caused to move by movement of the other elements within the linkage mechanism. Particularly, for the system shown in the figures presented herein, the balance beam 2020 in use has to move along an arc. For instance, referring back to FIG. 1, the central point C of the balance beam 2020 is connected to the intermediate lever 16. A rotation of the intermediate lever 16 will thus cause the central point C to move along an arc e.g. from left to right within the plane of the page as illustrated in FIG. 8B by the lower arrow extending through the central point C of the balance beam 2020. The connection of the SCAS actuators 201,202 and the balance beam 2020 must also follow this arc in order to keep the SCAS actuators 201,202 operatively connected to the balance beam 2020.

The flexible rods or quills 2012,2022 allow the SCAS actuators 201,202 to follow up and down and/or side to side movement of the bearings $J_A,J_B$ caused by such movement of the balance beam 2020 whilst maintaining the connection and without introducing potentially damaging side loads. The deformation of the rod or quill thus effectively takes up the lateral components of the movement of the balance beam 2020.

Whilst in normal use, as shown in FIG. 7, the balance beam 2020 is held approximately perpendicular to the SCAS actuators 201,202, if one of the SCAS actuators does not move, e.g. as a result of a failure, the remaining healthy actuator can continue its operation unabated, and the balance beam 2020 will then tilt with respect to its normal position, as illustrated in FIG. 8B by the upper arrow extending through the bearing $J_A$. Again, because the connection between the SCAS actuators 201,202 and the balance beam 2020 is provided through the flexible rods or quills 2012, 2022 within the pistons 2013,2023 of the SCAS actuators 201,202, this tilting can be accommodated for without losing connection or introducing potentially damaging side loads to the SCAS actuators 201,202. The ball bearings $J_A,J_B,J_C$ allow a relative rotation between balance beam, interfacing actuators and output element. The axes of the two actuators 201,202 have a distance which, for the worst single failure case, causes an angle between the balance beam and the line normal to the actuators axes, which is adequately accommodated by the design of the balance beam 2020.

Thus, where the balance beam 2020 moves along an arc or tilts within the plane of the output of the SCAS actuators (i.e. within the plane shown in FIGS. 7, 8A and 8B), the flexible rods or quills 2012,2022 of the pistons 2013,2023 may deform laterally into the surrounding space within the pistons 2013,2023 in order to follow the movement of the balance beam 2020. That is, the flexible rod or quill is arranged to accommodate an angular displacement of the balance beam by deforming into the surrounding space such that the deformation takes up any compressive or lateral forces applied to the piston 2013,2023 by the balance beam 2020.

In typical use, for the actuator system described herein, the movement of the balance beam 2020 and hence the deflection of the flexible rods or quills 2012,2022 will generally always be in the plane shown in FIGS. 7, 8A and 8B as the balance beam 2020 is generally constrained from moving in directions in and out of the plane by the other levers in the linkage mechanism and/or by its connection to the SCAS actuators 201,202. However, it will be appreciated that by providing a suitable rotatable joint between the flexible rods or quills 2012,2022 and the balance beam 2020, the SCAS actuators 201,202 may be arranged to follow any angular displacement of the balance beam 2020 i.e. to deform in any lateral or radial direction.

When both SCAS actuators 201,202 are operating, the flight control system will command the two SCAS actuators 201,202 in the nominal stroke range. When only one of the SCAS actuators 201,202 is operating, the active actuator is commanded by the flight control system in the double stroke range which generates a nominal stroke displacement at the common output of the two SCAS actuators 201,202. As mentioned above, a mechanical limit ($L_{CAS}$) may be provided at the summed output of the two SCAS actuators 201,202, which ensures a safety feature in case of unmitigated multiple failures of the SCAS actuators 201,202.

Another general consideration with the SCAS actuators 201,202 is that the SCAS actuators 201,202 should be capable of quickly re-centering when the actuator is depressurized, either because a loss of that hydraulic power supply, or because the solenoid valve is de-energized, and hence the servo valve supply line is connected to return after a SCAS failure is detected. In order to allow a rapid re-centering of the SCAS actuators 201,202 under the action of the centering springs, it may be necessary to provide a relatively large passage area to ensure that a flow between the two sides of the linear hydraulic actuator. This may obtained by building an offset into the servo valve, such that when no current is provided, the servo valve spool is not centered, thereby allowing an internal circulation of the fluid flow. When the SCAS actuators 201,202 are operating, and the flight control system energizes the solenoid valve, thereby hydraulically arming the servo valve, a compensating current is injected by the flight control system into the servo valve such to balance the offset, hence bringing the electrical null in correspondence to the hydraulic null.

In general, pressure switches may be used in each of the actuators to sense that the pressure supply is available, and that the relevant control valve 11 is operating correctly. The switches may change their status (open/closed) as a result of the pressure being below or above a certain threshold value. The pressure switches may thus provide an electrical or otherwise signal in case of a zero pressure condition, or anomalous behaviour of the control valves.

Inlet filters may also be provided to prevent debris entrained by the hydraulic fluid flowing through the control valves and through the SCAS actuators 201,202. An inlet filter may be installed for each of the actuators connecting the control valve bodies to the pressure supply ports of the hydraulic system.

Various electrical connectors may be provided. For example, two connectors may be provided to make up an electrical interface between one electrical lane of the flight control system and the SCAS solenoid valve, servo valve and position transducer 2011,2021. Another pair of connectors may be provided integral with the pressure switches.

Servo Actuator Operation

The following paragraphs present a functional description of the servo actuator 10 under normal and failure conditions, and for the two possible operating modes: with mechanical commands provided by the pilot and with commands provided by the SCAS module 20 in response to electrical commands generated by the flight control system.

Mechanical Inputs i) Normal Operation

With reference to FIG. 4, when a new command xi is given by the pilot, a rotation of the input lever 15 about its lower end connected to the actuators rod occurs, hence a displacement xc of its intermediate point 14 is obtained. As a result, the intermediate lever rotates about the SCAS input point F (zero SCAS demand). The rotation of the intermediate lever produces a rotation of the layshaft lever about the fixed hinge N and thus a displacement xv of the control valves spools. The displacement of the control valves spools away from the hydraulic null creates a pressure unbalance between the valve control lines and hence between the two sides of each section of the hydraulic actuator, which causes a movement of the actuator piston jack in the opposite direction. The movement of the actuator output brings about a displacement $x_p$ of the input lever as indicated in FIG. 4 and hence its rotation about the upper end which is now stationary. This process continues until the intermediate point of the input lever has returned to its initial position corresponding to hydraulic null position of the control valves spools; when this condition is reached the control valves ports are closed and the actuator movement stops. The input lever actually performs a difference between pilot input and actuator output, thereby mechanically closing a position feedback loop for the actuators position.

The control valves consist of two concentric spools. Under normal operating conditions each of the two control valves has the outer spool kept centred by its detent spring and the outer spool control ports are therefore closed. The actuator flow is controlled by its relevant valve as a result of the movements of the inner spools with respect to the outer spools; if no actuator movement is required, the inner spools are centred with respect to the outer spools since no flow has to be delivered to the actuator. If a load is acting on the actuator under stationary conditions, a very small displacement of the inner valve spool from the hydraulic null is necessary to build up the pressure differential across the two sides of each actuator section as necessary to balance the external load.

The displacements of the inner spools of the two control valves are equal since they are commanded by two equal control linkages with a common interface with the central hinge of the walking beam. An equal pressure differential is thus provided to the two hydraulic actuators as long as the supply/return pressures are equal for both hydraulic systems. The inner spools displacements are proportional to the displacement from neutral of the intermediate point of the input lever which performs the mechanical difference between the input travel (pilot command) and the actuator travel (feedback signal).

Under normal operating conditions, the outer spool covers the port P1 which is connected to the pressure switch. The pressure switch is also connected to the hydraulic pressure supply through a small orifice; therefore, since the port P1 is closed, the pressure switch senses the supply pressure and gives a positive indication that the system is operating normally.

ii) Single Hydraulic System Operation

In case one of the two aircraft hydraulic systems is not operating, the actuator section connected to that hydraulic system cannot provide any active force. The servo actuator continues to operate under the action of the healthy actuator section, though with a lower maximum load capability. The servo actuator section connected to the active hydraulic system operates as described above for the normal operating conditions, while the servo actuator section interfacing with the non-operational hydraulic system is driven by the active one. When the actuator is commanded to move, the active actuator section develops the necessary pressure force to drive the helicopter control mechanism and the passive section of the actuator.

The control valve metering ports size is such to create a relatively low pressure drop in the fully open valve condition in order to reduce the force necessary to drive the passive section of the actuator during single system operation.

When one of the two hydraulic systems is not operating or the supply pressure is low, the pressure switch of the servo actuator section connected to that system senses a low pressure and thus provides the indication that the relevant actuator section is not operating.

iii) Jam of Control Valve Internal Spool

In case of seizure of the internal spool of one of the two control valves, the internal spool entrains the outer spool overcoming the spring detent acting on the outer spool, which causes an increase of the force to be developed to move the valve spool. This is reflected into an increase of the force required to the pilot to move the control stick, or to the SCAS actuators when they are generating the command. In this failure condition inner and outer spool of the control valve move together as a single rigid body. The two limit conditions for this failure case are those of inner valve spool jammed inside the outer spool in the hydraulic null condition and inner valve spool jammed inside the outer spool in any of the two fully open ports conditions.

SCAS Operation

The SCAS actuators 201,202 provide a controlled displacement of the central point of the balance beam in response to electrical signals received from the aircraft FCS. The controlled displacement of that point of the linkage mechanism has the effect of superimposing small amplitude commands to those established by the pilot.

Starting from a neutral condition, a displacement of the central point of the balance beam eventually brings about a displacement of the control valves spools. Flow is then delivered to the actuators, whose movement causes a progressive rotation of the input lever until the control valves spools are brought back to their hydraulic null position.

Each SCAS actuator 201,202 is capable of the defined travel. A stop ($L_{SCAS}$) on the common output link limits the maximum possible command from the SCAS to the linkage to a predefined value. This effectively limits the SCAS authority to the amount defined by the requirement.

i) SCAS Operation—Normal Condition

The SCAS actuators 201,202 provide a controlled displacement in response to electrical input signals received from the flight control system and feed back to the flight control system electrical signals proportional to their output position, which enables the flight control system to perform a closed loop control of the SCAS actuators 201,202 position. Under normal operating conditions the SCAS actuators 201,202 operate in an active/active mode; their output displacements are summed by the balance beam 2020. The flow to each SCAS actuator 201,202 is controlled by an electrohydraulic servo valve whose current is determined by the flight control system according to an appropriate control law. The general control architecture is presented in the following.

For each SCAS actuator 201,202 the flight control system issues an arming signal to a solenoid valve whose control port is connected to the servo valve pressure port. When the solenoid valve is energized its control port is connected to the pressure supply line; the servo valve pressure port is hence connected to the system pressure line and the operation of the SCAS actuators 201,202 is enabled.

The movement of the actuator is measured by its LVDT and fed back to the flight control system for position indication and monitoring of the SCAS actuators 201,202.

Each of the two SCAS actuators 201,202 has a stroke equal to twice the nominal operating stroke required at the output of the balance. In normal operating conditions each SCAS actuator 201,202 is only commanded in the nominal operating stroke range by the flight control system and an uncommanded movement of an actuator can be balanced by an opposite movement of the other actuator. However, a hardware protection is added on the output link preventing the movements of this mechanical element beyond the nominal operating stroke, thereby effectively keeping the maximum SCAS authority within the specified limit.

Figure 9:
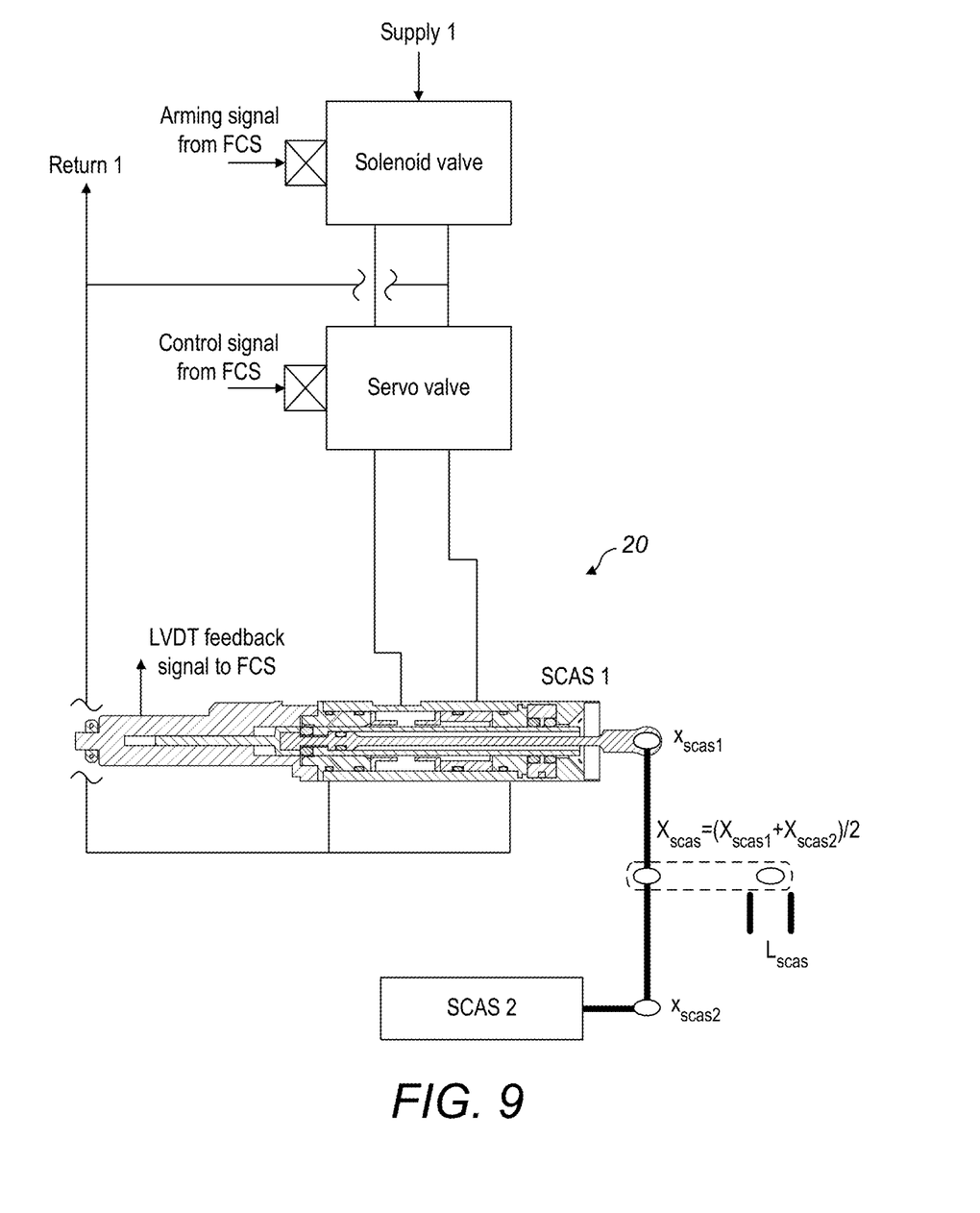
FIG. 9 shows schematically the operation of the actuators of the SCAS module.

The output link performs the algebraic sum of the displacements of the two SCAS actuators 201,202 and ensures that the forces provided by the two SCAS actuators 201,202 are always equal, which is beneficial for the resolution and the hysteresis of the SCAS actuator 201,202. The concept schematic of the SCAS actuator 201,202 based on the displacement summed configuration is shown in FIG. 9.

ii) SCAS Operation—Failure Condition

If a SCAS actuator 201,202 fails, the failure is detected by the monitoring functions performed by the flight control system. When a failure is recognized, the arming signal to the solenoid valve is removed and the pressure line of the servo valve gets connected to return. If the failure consists of a SCAS actuator seizure, that actuator will remain in its jammed position. For all other failure cases the SCAS actuator centering spring 2014,2024 will bring the actuator to its centred position while flow passes from one side of the SCAS actuator 201,202 to the servo valve internal leakage passageways. At the same time the flight control system introduces a compensation in the command of the remaining healthy actuator in order to allow the SCAS actuator common output to reach the commanded position. The compensation consists of doubling the SCAS command and injecting a bias in the command of the operating actuator equal to the instantaneous position of the failed actuator. If the SCAS actuator failure consists of a failure of its LVDT 2011,2021, the bias will be set to zero.

For the worst case of a SCAS actuator jammed in the extended position, the healthy actuator can be commanded in the opposite direction up to twice the nominal operating stroke in the opposite direction, therefore the resulting travel range for the common output link is half-stroke in the retracted direction. For the same reason, if a SCAS actuator 201,202 jams in the retracted position, the resulting travel range for the common link output is half-stroke in the extended direction. For all other failure cases, the failed actuator will eventually re-centre under the action of its springs and the full nominal travel range will be retained by the common output link.

Each of the two SCAS actuators 201,202 is individually controlled by an independent lane of the flight control system. The SCAS position commands generated by the flight control system in response to the aircraft aerodynamic loop are compared with the SCAS position feedback signals generated by the LVDTs 2011,2021 of the SCAS actuators 201,202 and a position control loop is performed by the flight control system with the applicable control law.

If a failure occurs in one of the two SCAS actuators 201,202, or in the relevant control lane, the failure is recognized by the SCAS actuators monitor, the solenoid valve of the failed actuator is de-energized, the servo valve supply is connected to return and the actuator is centred under the action of the centering springs, except for the case of a jammed SCAS actuator.

Although the techniques presented herein have been described with reference to particular embodiments, it will be understood by those skilled in the art that various changes in form and detail may be made without departing from the scope of the invention as set forth in the accompanying claims.

The invention claimed is:

1. A Stability and Control Augmentation System ("SCAS") module comprising one or more SCAS actuators, the or each SCAS actuator comprising:
   a substantially cylindrical hydraulic chamber;
   a piston arranged for linear motion along a first axis of said hydraulic chamber; and
   a valve for controlling a flow of hydraulic fluid into the hydraulic chamber to cause said piston to move along said first axis;
   wherein said piston comprises a flexible rod or quill operatively connected to a first movable element and is arranged for providing a linear output to said first movable element along said first axis such that said linear output causes a movement of the first movable element in a direction parallel to said first axis,
   wherein said flexible rod or quill is mounted internally within an annular portion of said piston such that a space is defined between said flexible rod or quill and said annular portion in a second direction perpendicular to said first axis, and wherein said flexible rod or quill is configured for deforming into said space to accommodate displacement of said first movable element.

2. The SCAS module of claim 1, wherein said flexible rod or quill is arranged to deform so that the flexible rod or quill remains operatively connected to said first movable element during said displacement of said first movable element.

3. The SCAS module of claim 1, wherein said flexible rod or quill is connected to said first movable element by a rotational joint.

4. The SCAS module of claim 1, wherein said first movable element is a balance beam or lever.

5. The SCAS module of claim 4, comprising first and second SCAS actuators, the first and second SCAS actuators each comprising a flexible rod or quill for providing a linear output to said balance beam or lever, wherein the flexible rods or quills of said first and second SCAS actuators are each operatively connected to said lever or balance beam to provide said linear outputs thereto, and wherein said lever or balance beam is arranged to sum the linear outputs provided by said first and second SCAS actuators, wherein the flexible rods or quills of the first and second SCAS actuators are configured to deform so as to follow a displacement of said lever or balance beam.

6. The SCAS module of claim 5, wherein the flexible rods or quills of said first and second SCAS actuators are operatively connected to opposite ends of said lever or balance beam and wherein said linear outputs of said first and second SCAS actuators are arranged to cause a central point of said lever or balance beam to move in a direction parallel to said first axis, and wherein said flexible rods or quills are configured to deform to accommodate rotation of said lever or balance about said central point and/or to accommodate movement of said central point along an arc.

7. The SCAS module of claim 5, wherein said first and second SCAS actuators are mounted parallel to each other, wherein in use said lever or balance beam is substantially perpendicular to the axes of said first and second SCAS actuators, and wherein in the event of a failure of said first and/or second SCAS actuators, said lever or balance beam is caused to rotate towards the first axis of said first or said second SCAS actuator.

8. The SCAS module of claim 1, wherein the or each SCAS actuator comprises a biasing element for biasing said piston towards a pre-determined position when the flow of hydraulic fluid into the hydraulic chamber is zero.

9. The SCAS module of claim 1, further comprising a flight control system for providing electrical command signals to said one or more SCAS actuators, wherein said valve controls the flow of hydraulic fluid into the hydraulic chamber, and hence the position of said piston along the first axis of the hydraulic chamber, in response to said electrical command signals.

10. The SCAS module claim 1, wherein the motion of the piston along said first axis within said hydraulic chamber of said one or more SCAS actuators is limited by one or more end stops provided within said SCAS module.

11. An actuator system for a helicopter comprising:
    a hydraulic actuator for providing an output to a main or tail rotor of the helicopter;
    a Stability and Control Augmentation System ("SCAS") module as claimed in claim 1;
    a control valve for controlling the flow of hydraulic fluid to said hydraulic actuator to vary said output provided to the main or tail rotor; and
    a linkage mechanism connecting said control valve to said hydraulic actuator, said linkage mechanism comprising a plurality of interconnected levers including a first lever for receiving an input from a pilot, and a second input arranged to receive an output from said SCAS module, wherein said linkage mechanism is configured to sum the outputs from said first and second levers into a composite command and to transmit the composite command to the control valve to control the flow of hydraulic fluid to the hydraulic actuator.

12. The actuator system claim 11, further comprising a flight control system for providing electrical command signals to said one or more SCAS actuators, wherein said valve controls the flow of hydraulic fluid into the hydraulic chamber, and the position of said piston along the first axis of the hydraulic chamber, in response to said electrical command signals.

13. The actuator system of claim 11, wherein the motion of the piston along said first axis within said hydraulic chamber of said one or more SCAS actuators is limited by one or more end stops provided within said linkage mechanism.

\* \* \* \* \*